United States Patent [19]

Haupt

[11] 4,268,232
[45] May 19, 1981

[54] INTERMESHING GEAR PUMP WITH SEALING MEANS COMPRISING TWO CONCENTRIC SLIDE RINGS

[75] Inventor: Fritz Haupt, Regensdorf, Switzerland

[73] Assignee: Maag Gearwheel & Machine Company Ltd., Zürich, Switzerland

[21] Appl. No.: 21,786

[22] Filed: Mar. 19, 1979

[30] Foreign Application Priority Data

Apr. 7, 1978 [CH] Switzerland .................. 3757/78

[51] Int. Cl.³ .................. F04C 2/18; F04C 15/00; F16J 15/40; F16J 15/34
[52] U.S. Cl. .................. 418/135; 418/206; 277/27; 277/65; 277/70; 277/74; 277/93 R
[58] Field of Search .................. 418/131, 132, 134, 135, 418/205, 206; 277/27, 65, 70, 74, 93 R

[56] References Cited

U.S. PATENT DOCUMENTS

| | | | |
|---|---|---|---|
| 1,478,417 | 12/1923 | Wottring et al. | 418/206 |
| 2,679,412 | 5/1954 | Whitfield | 277/74 |
| 2,996,015 | 8/1961 | Prasse | 418/135 |
| 3,112,867 | 12/1963 | Roberts | 418/206 |
| 3,591,188 | 7/1971 | Eisner | 277/65 |
| 4,101,139 | 7/1978 | Nordin | 277/65 |

FOREIGN PATENT DOCUMENTS

| | | | |
|---|---|---|---|
| 1330063 | 5/1963 | France | 277/74 |
| 980810 | 1/1965 | United Kingdom | 277/74 |
| 271203 | 8/1970 | U.S.S.R. | 277/74 |

*Primary Examiner*—John J. Vrablik
*Attorney, Agent, or Firm*—Werner W. Kleeman

[57] ABSTRACT

A gear pump having a housing and a pump space or chamber within which there are arranged two intermeshing, fluid-conveying gears, each gear being arranged upon an associated shaft. Each shaft is provided at least at the one side of the related gear with a shaft bearing and between such shaft bearing and the gear a sliding ring packing or seal which bounds the pump space or chamber. The sliding ring packing comprises two concentric sliding rings arranged at least approximately in a common radial plane, there being formed between such sliding rings an intermediate space which can be impinged with a barrier or blocking fluid.

9 Claims, 3 Drawing Figures

INTERMESHING GEAR PUMP WITH SEALING MEANS COMPRISING TWO CONCENTRIC SLIDE RINGS

BACKGROUND OF THE INVENTION

The present invention relates generally to a novel construction of gear pump, and, more specifically, to a gear pump wherein two intermeshing, fluid-conveying gears arranged within the pump chamber or space of a housing, are each arranged upon a respective shaft which has operatively associated therewith at the one side of the related gear a shaft bearing and between such shaft bearing and the gear there is provided a slide or sliding ring packing or seal.

In contrast to gear pumps whose shaft bearings are arranged in the pump chamber, for instance as taught in German patent publication No. 2,649,130, gear pumps of the here described type are also suitable for fluid media which, by virtue of their viscosity and/or their corrosive behavior, must be maintained out of contact with the shaft bearings. With a heretofore known gear pump of the type under discussion as disclosed in U.S. Pat. No. 2,369,249 both of the shafts, to each side of the pump chamber, are extended through a respective packing or stuffing box and in spaced relationship from both sides of the housing are mounted in shaft bearings completely separated from the housing. With this arrangement even small quantities of the conveyed medium, which can escape through the packing boxes, cannot reach the shaft bearings. However, with this design there must be tolerated a large spacing of the shaft bearings, and therefore, such type gear pump only can operate at a moderate pump pressure, since the radial forces acting upon the fluid conveying gears, in the presence of high pump pressures, would bend the shafts in a manner which would impair the effectiveness and service life of the packing or stuffing boxes. With pronounced bending of the shaft there would even be present the danger of freezing of the bearings.

The same is equally true for a different state-of-the-art gear pump construction of the previously described species, as disclosed in U.S. Pat. No. 3,526,470. Here, each of both shafts carries an auxiliary gear in spaced relationship and adjacent the fluid conveying gear attached to the related shaft and is mounted at both sides of such auxiliary gear in a housing part which is separated from the pump chamber by sliding ring seals which are effective in radial direction. With this arrangement both of these shafts are sufficiently rigidly designed and mounted at the region of the auxiliary gears which synchronize such shafts. Yet, the large bearing spacing of the fluid conveying gears only permits operation at moderate pump pressures, since at higher pump pressures the forces acting upon the fluid conveying gears bend the shafts in a manner that there is impaired the service life of the sliding ring seals which are effective in radial direction. Furthermore, the sliding ring seal arranged at each shaft, forwardly of which there is mounted a stripper, can only incompletely protect the shaft bearing, so that during the pumping of highly corrosive liquids it is to be expected that bearing damage will soon arise.

SUMMARY OF THE INVENTION

Therefore, with the foregoing in mind it is a primary object of the present invention to provide a new and improved construction of gear pump which is not associated with the aforementioned drawbacks and limitations of the prior art proposals.

Another and more specific object of the present invention aims at the provision of a new and improved construction of gear pump of the previously mentioned type, which is capable of also attaining a high service life when it conveys highly viscous and corrosive liquids at high pressures in the order of about 300 bars.

Yet a further significant object of the present invention aims at the provision of a new and improved construction of gear pump which is relatively simple in construction and design, economical to manufacture, extremely reliable in operation, requires a minimum of maintenance and servicing, and is not readily subject to breakdown or malfunction, while affording good service life even when pumping highly viscous and corrosive fluid media at high pump pressures.

Now in order to implement these and still further objects of the invention, which will become more readily apparent as the description proceeds, the sliding ring seal, contemplated by the invention, comprises two substantially concentric bearing or slide rings arranged at least approximately in a common radial plane. Between such bearing or slide rings there is formed an intermediate space into which there can be delivered a blocking or barrier fluid.

Both of the concentric slide or sliding rings, together with the intermediate space arranged therebetween, do not require any more space, in axial direction of the related shaft, than a single slide ring. Consequently, the shaft bearings, although they are completely separated from the pump chamber by the slide rings and the intermediate space impinged with the blocking fluid or fluid medium, can be arranged at a slight spacing from the fluid conveying gears. Consequently for a given shaft cross-sectional area it is possible to maintain extremely small bending-through of the shafts even at high pump pressures. The concentric arrangement of the slide rings additionally contributes to the beneficial result that it is possible to maintain the total axial structural length of the gear pump small. By infeeding a blocking or barrier fluid into the intermediate space between the slide rings it is possible to prevent penetration of even traces of the conveyed or pumped fluid medium into those parts of the pump fabricated of a material which is not corrosion resistant.

According to a preferred embodiment of the invention both of the concentric slide rings are arranged between end surfaces of a bushing or sleeve which is axially and radially mounted in shaft bearings and secured for conjoint rotation at the related shaft and a counter ring which is fixedly held against rotation within the housing. These slide rings are loaded by springs in axially direction, against the pressure of the pumped medium or blocking fluid.

With this design of the invention, on the one hand, there is advantageously combined the shaft bearings, to which belong the bushings, in a space-saving manner with the sliding ring seals, and, on the other hand, there is realized a particularly extensive protection of the sliding bearings against one-sided overloading due to bending of the shafts.

The described construction of the invention can be further designed in that, the bushing or sleeve has a substantially bell-shaped flange which supports the springs, surrounds the radial outer slide ring and is sealed in relation to such in radial direction by an outer sealing ring, whereas the radial inner slide ring is sealed with respect to the related shaft by an inner seal or sealing ring. This division of the sealing functions, namely, on the one hand, sealing of the slide rings revolving with the shaft in relation to the stationary counter ring, and, on the other hand, sealing of the slide rings in relation to the shaft and the bell-shaped flange of the bushing revolving with the shaft, renders it possible to select for the slide rings a material having good sliding properties and high corrosion resistance. This material need not be particularly elastic. On the other hand, it is possible to select for the sealing rings a material predominantly in consideration of its elasticity and corrosion resistance and without particular consideration being given to its sliding properties. Thus, for instance, there can be used as the material for the slide rings graphite and for the sealing rings an elastomer.

Further advantageous features of the described construction of the invention reside in the fact that between each slide ring and the related springs there is arranged a pressure ring. This pressure ring is connected for conjoint rotation with the flange, however so as to be axially displaceable, and further, the related sealing ring is arranged in a substantially ring-shaped recess of the slide ring and which is open towards the pressure ring and can be loaded by the pressure ring. As a result there is achieved the advantage that the pressure of the springs, acting in an axial parallel direction, is distributed comparatively uniformly at the related slide ring which is possibly sensitive to local loads and, on the other hand, causes a deformation of the related sealing ring, by means of which there is realized a positive radial seal between the slide ring and the shaft or the bell-shaped flange, respectively.

Each of the bushings is advantageously clamped with the related shaft so as to form a rigid unit in axial direction. Consequently, it is possible to appreciably increase the resistance moment of the shafts against bending. This prevents deformation of the shafts, and thus, contributes in the protection of the slide rings.

The last-mentioned feature can be used with particular advantage in the case of a gear pump whose shafts, in known manner, are mounted at both sides of the fluid conveying gears and are driven by means of a shaft journal of one of the shafts which protrudes out of the housing. In this case, the shafts are advantageously axially clamped or loaded at all bearing locations with a respective bushing or sleeve.

If the gear pump is provided with intermeshing auxiliary gears attached in conventional manner to the shafts, then it is necessary that, according to the invention, each bushing or sleeve adjoining an auxiliary gear be loaded in axial direction by a suitable loading or tightening device engaging at the auxiliary gear, for instance a tightening or loading cap. In this case each auxiliary gear, together with the related bushing or sleeve and shaft, forms a particularly flexurally rigid unit for given dimensions, which however, is easily disassembled, if such is needed for instance for exchanging the slide rings.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
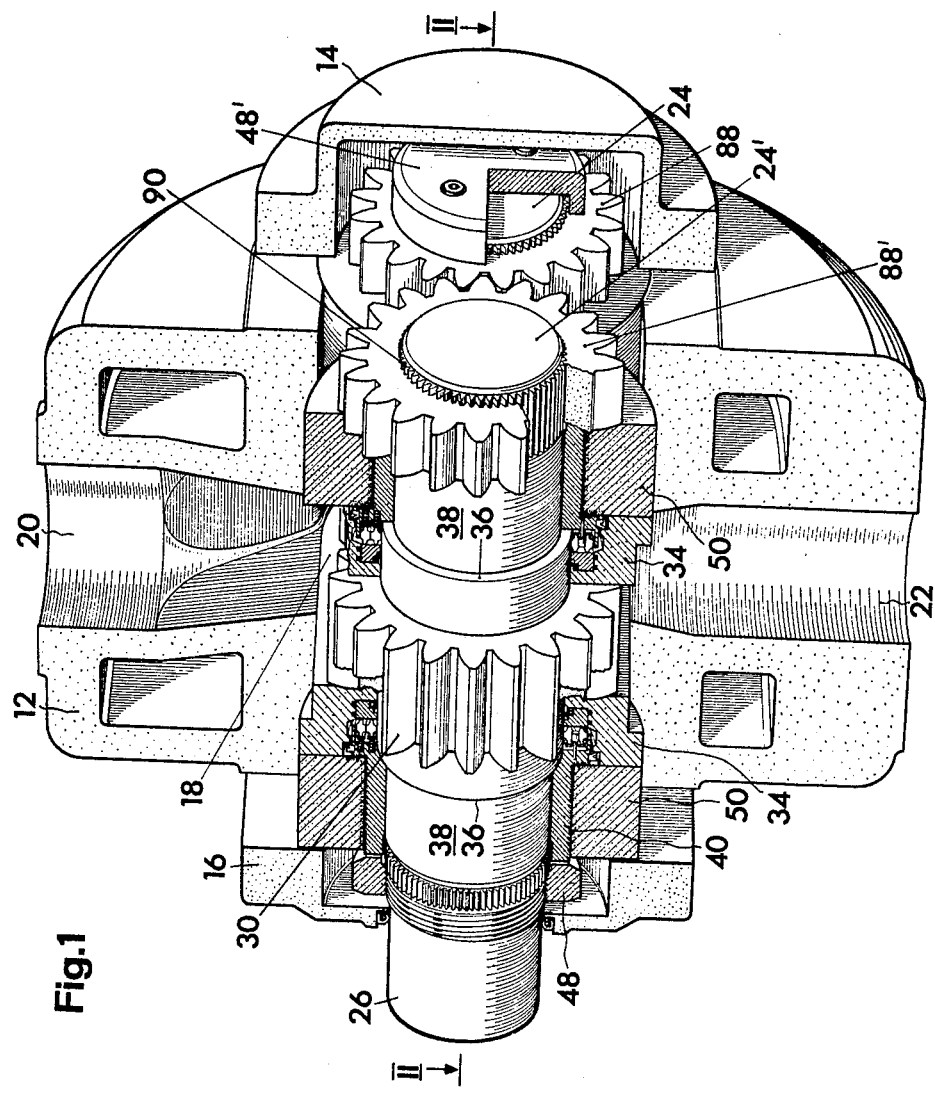
FIG. 1 is a perspective view of a gear pump constructed according to the invention and in a cutaway illustration along the axis of rotation of one of its shafts.

Describing now the drawings, the therein exemplary illustrated embodiment of gear pump comprises an essentially cylindrical housing 12 which is closed at both end faces or ends by a respective housing cover or cover plate 14 and 16 and encloses a pump or conveying chamber or space 18 including the inlet 20 and outlet 22 for the pumped fluid medium.

Arranged within the housing 12 are two mutually parallel shafts 24 and 24'. These shafts 24 and 24' are essentially of the same construction, with the exception that the shaft 24' possesses a shaft journal 26 protruding outwardly through the housing cover 16, whereas the shaft 24 is arranged completely between the housing covers 14 and 16. Both shafts 24 and 24' each have an intermediate shaft section 28 upon each of which there is arranged a respective fluid conveying or pumping gear 30, for instance shrunk-fitted thereon. Both gears 30 are arranged in the pump or conveying chamber 18 and mesh with one another, so that these gears 30, when the shaft 24' is driven by means of the shaft journal 26 and thus also rotates the shaft 24, pump liquid from the inlet 20 through the pump chamber 18 to the outlet or discharge 22.

Merging with the intermediate shaft section 28 of each shaft 24 and 24' and to both sides of the related shaft section 28 is a respective shaft section or portion 32 of somewhat smaller diameter. The shafts 24 and 24' extend by means of these shaft sections or portions 32 to both sides of the pump chamber 18 into a respective substantially eyeglass-shaped housing insert or insert member 34. Within each such insert member 34 each of the related shafts 24 and 24' has a respective shaft shoulder 36 at which merges a shaft section or portion 38 of further reduced diameter.

Figure 2:
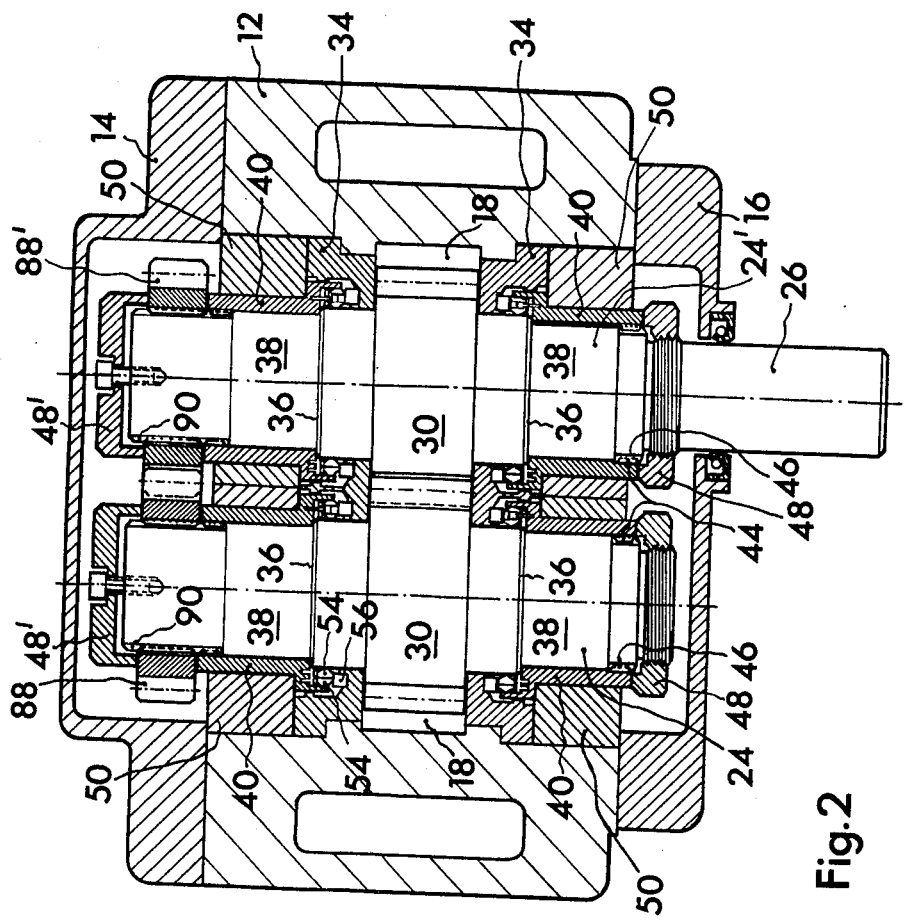
FIG. 2 is a cross-sectional view of the gear pump of FIG. 1, taken substantially along the line II—II thereof.
Figure 3:
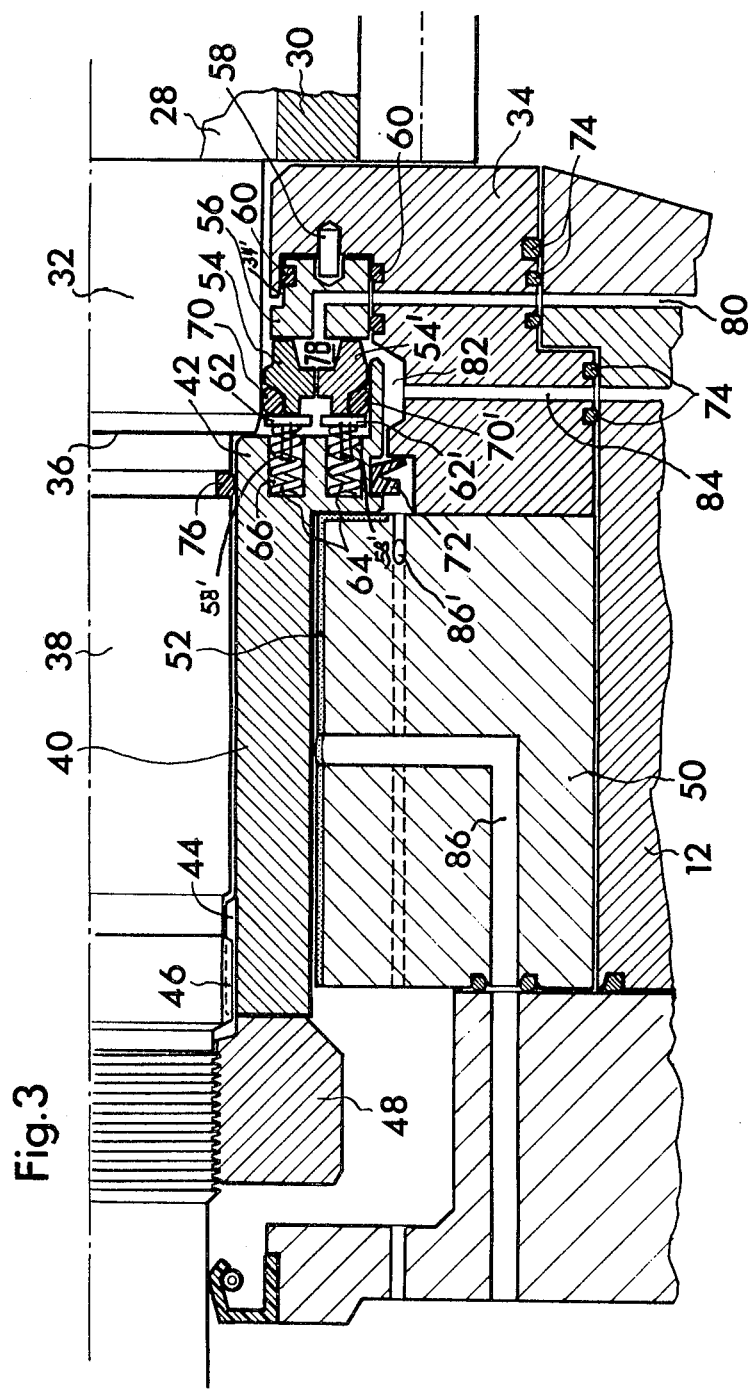
FIG. 3 is an enlarged detail showing of part of the arrangement of FIG. 2.

Each shaft section or portion 38 is enclosed by a bushing or sleeve 40 which possesses, at its end confronting the related fluid conveying gear 30, a substantially bell-shaped flange 42 and at its other end has an internal multi-groove profiled portion 44. Each of the multi-groove profiled portions 44 engages into an appropriate, complementary configured, external multi-groove profiled portion 46 of the related shaft 24 and 24', respectively, so that each of the bushings 40 is conjointly connected for rotation with the related shaft. Each of the bushings or sleeves 40 is pressed or loaded against the related shaft shoulder 36, by any suitable loading means, here shown as a related clamping or tightening nut 48 or tightening or clamping cap 48' screwed onto the related shaft 24 and 24', as best seen by referring to FIG. 2, so that each of both shafts 24 and 24' is clamped together with its two bushings or sleeves 40 into a rigid unit.

Each of the bushings or sleeves 40 is axially and radially mounted in an associated shaft bearing 50 which is clamped between the related eyeglass-shaped housing insert member 34 and housing cover 14 or 16, as the case may be, and has a lining 52 formed of a material having good sliding and lubricating properties, for instance lead bronze. While each shaft section 38 preferably consists of corrosion-resistant steel having poor mechanical properties, the bushings or sleeves 40 possess exceptionally good running properties.

The substantially bell-shaped flange 42 of each bushing 40 encloses a radial inner slide or sliding ring 54 and a radial outer slide or sliding ring 54' which is arranged concentrically with respect to the inner slide ring 54. Each of the slide rings 54 and 54' bears by means of its essentially flat or planar end surfaces or faces, which confront the related fluid conveying gear, against a likewise flat or planar, radial end surface of a counter ring 56 inserted into a substantially ring-shaped recess 34' of the related eyeglass-shaped housing insert 34 and held against rotation therein by one or a number of axially parallel pins 58 or equivalent structure and sealed by an inner and two outer circular or O-seals 60 or equivalent sealing means.

At the planar end surface of each slide ring 54 and 54', and which end surface faces away from the related counter ring 56, there bears a pressure ring 62 and 62', respectively, under the action of the pressure of axially parallel resilient elements, here shown as springs 64. These springs 64 are retained at a uniform angular spacing within likewise axially parallel extending bores or holes 66 of the related bell-shaped flange 42. Each pressure ring 62 and 62' is connected by axially parallel pins 58' or the like for conjoint rotation, however axially displaceable with the related bushing or sleeve 40.

Between each inner slide ring 54 and the shaft section 32 of the related shaft 24 and 24', respectively, there is arranged an inner seal or sealing ring 70. In corresponding manner there is arranged between each outer slide ring 54' and the inner jacket or inner surface of the related bell-shaped flange 42 an outer seal or sealing ring 70'. While the slide rings 54 and 54' are formed of a relatively non-elastic material having good sliding properties, such as graphite, the sealing rings 70 and 70' are formed of an elastomer, and therefore, these sealing rings 70 and 70', by virtue of the pressure exerted thereat by the springs 64 through the related pressure rings 62 and 62', respectively, are compressed in axial direction in a manner such that they widen in radial direction, and consequently, establish a tight connection between the related slide ring 54 or 54', as the case may be, and shaft section 32 or related bell-shaped flange 42, respectively.

The bell-shaped flange 42 of each bushing or sleeve 40 is sealed by a scraper or stripper ring 72 with respect to the related eyeglass-shaped housing insert 34, which, in turn, is sealed by O-seals 74 or equivalent structure with respect to the housing 12. Within each bushing or sleeve 40 there is arranged a further O-seal 76 which provides a sealing action with respect to the related shaft 24 and 24', respectively.

Between each two coacting slide rings 54 and 54' there is formed a substantially ring-shaped intermediate space or compartment 78 into which there can be delivered, via an infeed channel 80, a blocking or barrier fluid or fluid medium by means of a not particularly illustrate auxiliary pump. Between each radial outer slide ring 54' and the neighboring stripper ring 72 there is formed a further substantially ring spaced space or compartment 82, from which location there leads towards the outside a control or checking channel 84 or equivalent structure. Any leakiness of the slide rings 54 and 54' can be determined in that a small amount of the blocking or barrier fluid and/or the pumped medium escapes through the control channel 84.

By means of a lubrication channel 86 the lining 52 is furnished with a suitable lubricant which, at the lubricant exit location of such lining 52, is propelled against the related stripper or scraper ring 72 and can flow back, by means of a lubrication channel 86', to the starting or supply source.

At the ends of both shafts 24 and 24', facing away from the shaft journal 26, there is attached a respective auxiliary gear 88 by means of a multi-groove profiled portion 90. These auxiliary gears 88 mesh with one another and synchronize both shafts 24 and 24' in such a manner that the flanks of the fluid conveying gears 30 do not contact one another. The loading or tightening caps 48' transmit their axial loading or tightening force, by means of the auxiliary gears 88, to the related bushings or sleeves 40.

Of course, provision may be made, should the pumped medium require such, to heat the housing 12 by means of the different not particularly referenced passages or channels.

While there are shown and described present preferred embodiments of the invention, it is to be distinctly understood that the invention is not limited thereto, but may be otherwise variously embodied and practiced within the scope of the following claims. Accordingly,

What I claim is:

1. A gear pump for pumping highly viscous medium at high pressures comprising:
    a housing providing a pump chamber therein;
    two intermeshing, fluid-conveying gears arranged in said pump chamber;
    a respective shaft upon which there is mounted a related one of said gears;
    each said shaft being provided to one side of the related gear with shaft bearing means and between said shaft bearing means and the related gear a sliding ring sealing means adjoining the pump chamber;
    said sliding ring sealing means comprising two essentially concentric slide rings arranged at least approximately in a common radial plane;
    said two slide rings coacting with one another so as to form therebetween an intermediate space;
    means for supplying a blocking fluid to said space;
    a respective axially mounted bushing arranged in the shaft bearing means of the related shaft and secured to the shaft for conjoint rotation therein;
    means for loading in axial direction each of the bushings with its related shaft into a rigid unit;
    a counter ring fixedly retained against rotation within the housing;
    both of said concentric slide rings being arranged between end surfaces of said bushing and said counter ring; and
    spring means for loading said slide rings in axial direction against the force of the pumped fluid medium and the blocking fluid.

2. The gear pump as defined in claim 1, further including:
    means including said shaft bearing means and said bushings for mounting each of the shafts to both sides of the related fluid conveying gear;
    one of the shafts having a shaft journal protruding out of said housing for driving said one shaft and thus both of the gears; and means for axially loading by means of a respective one of said bushings the shafts at all of the mounting locations.

3. The gear pump as defined in claim 2, further including:
intermeshing auxiliary gears mounted at said shafts;
said mounting means including a further bushing neighboring each auxiliary gear; and
said loading means including tightening means for loading in axial direction each bushing neighboring its its related auxiliary gear.

4. The gear pump as defined in claim 3, wherein:
each said tightening means engages at the related auxiliary gear.

5. The gear pump as defined in claim 4, wherein:
each said tightening means comprises clamping means.

6. The gear pump as defined in claim 5, wherein:
said clamping means comprise clamping nut means.

7. The gear pump as defined in claim 5, wherein:
said clamping means comprise clamping cap means.

8. A gear pump for pumping highly viscous medium at high pressures comprising:
a housing providing a pump chamber therein;
two intermeshing, fluid-conveying gears arranged in said pump chamber;
a respective shaft upon which there is mounted a related one of said gears;
each said shaft being provided to one side of the related gear with shaft bearing means and between said shaft bearing means and the related gear a sliding ring sealing means adjoining the pump chamber;
said sliding ring sealing means comprising two essentially concentric slide rings arranged at least approximately in a common radial plane;
said two slide rings coacting with one another so as to form therebetween an intermediate space;
means for supplying a blocking fluid to said space;
a respective axially mounted bushing arranged in the shaft bearing means of the related shaft and secured to the shaft for conjoint rotation therein;
a counter ring fixedly retained against rotation within the housing;
both of said concentric slide rings being arranged between end surfaces of said bushing and said counter ring;
spring means for loading said slide rings in axial direction against the force of the pumped fluid medium and the blocking fluid;
each said bushing possesses a substantially bell-shaped flange for supporting said spring means;
said slide rings defining a radial outer slide ring and a radial inner slide ring;
said bushing surrounding the radial outer slide ring;
an outer sealing ring for sealing the bushing with respect to the radial outer slide ring in radial direction; and
an inner sealing ring for sealing the radial inner slide ring with respect to the related shaft.

9. The gear pump as defined in claim 8, further including:
a pressure ring arranged between each slide ring and the related spring means;
means for connecting for conjoint rotation said pressure ring with the related bell-shaped flange but enabling axial displacement of such pressure ring;
each of said slide rings having a substantially ring-shaped recess open in the direction of the related pressure ring; and
the sealing rings of the related pressure ring being arranged in said ring-shaped recess of the related slide ring and being loaded by the related pressure ring.

* * * * *